United States Patent
Schechtel et al.

(10) Patent No.: US 6,186,462 B1
(45) Date of Patent: Feb. 13, 2001

(54) ADJUSTABLE STAND APPARATUS

(75) Inventors: Kevin J. Schechtel, Arlington Heights; David J. Galovich, Roselle, both of IL (US)

(73) Assignee: 3COM Corporation, Rolling Meadows, IL (US)

(*) Notice: Under 35 U.S.C. 154(b), the term of this patent shall be extended for 0 days.

(21) Appl. No.: 09/307,578

(22) Filed: May 7, 1999

(51) Int. Cl.[7] .................................................. A47G 29/00
(52) U.S. Cl. .................. 248/371; 248/349.1; 248/917; 248/923
(58) Field of Search .................................. 248/371, 393, 248/133, 143, 139, 349.1, 372.1, 917, 919, 923, 920

(56) References Cited

U.S. PATENT DOCUMENTS

| 4,368,867 | * | 1/1983 | Pendleton et al. | 248/346.01 |
| 4,494,720 | * | 1/1985 | Gregory et al. | 248/371 |
| 4,591,120 | * | 5/1986 | Bryant-Jeffries et al. | 248/179 |
| 5,518,216 | * | 5/1996 | Wu | 248/371 |
| 5,683,068 | * | 11/1997 | Chase et al. | 248/371 |
| 5,881,985 | * | 3/1999 | Hoenig | 248/371 |
| 5,887,837 | * | 3/1999 | Johns et al. | 248/371 |
| 6,007,038 | * | 12/1999 | Han | 248/371 |

* cited by examiner

Primary Examiner—Anita M. King
(74) Attorney, Agent, or Firm—Baniak Nicholas Pine & Gannon

(57) ABSTRACT

An adjustable stand apparatus includes a base member and a top member. The base member includes a left portion and a right portion. Both the left and the right portions include elongated openings. The elongated openings include retaining regions having a first width and first receiving regions having a second width, with the second width being greater than the first width. The elongated openings further include tab portions, which extend into the first receiving regions. The top member also includes a left portion and a right portion. Both the left and the right portions of the top member include first guide portions, which extend from a bottom side of the top member. The first guide portions include an outer width, which is greater than the first width of the retaining regions of the elongated openings. The first guide portions are received in the first receiving regions, and are retained within the retaining regions.

20 Claims, 5 Drawing Sheets

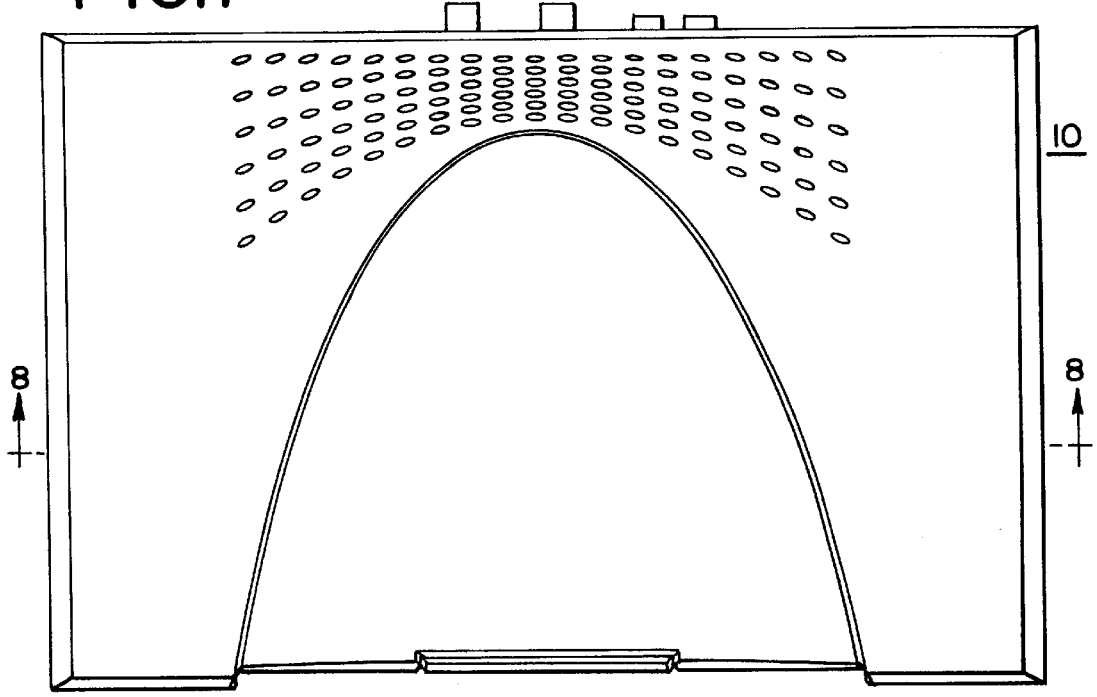
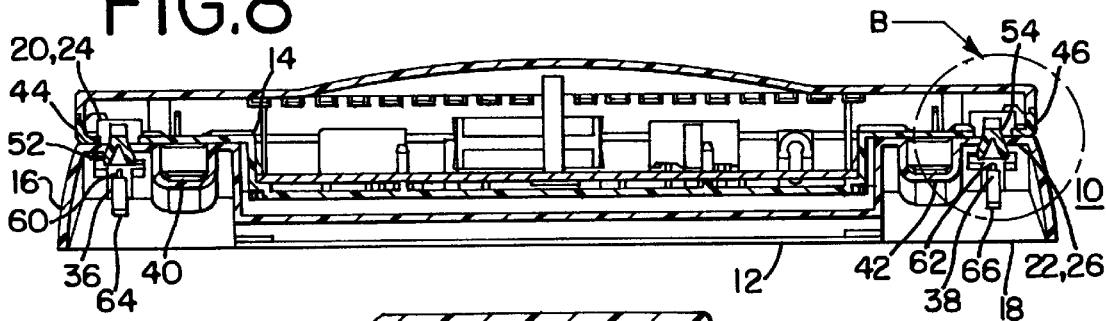
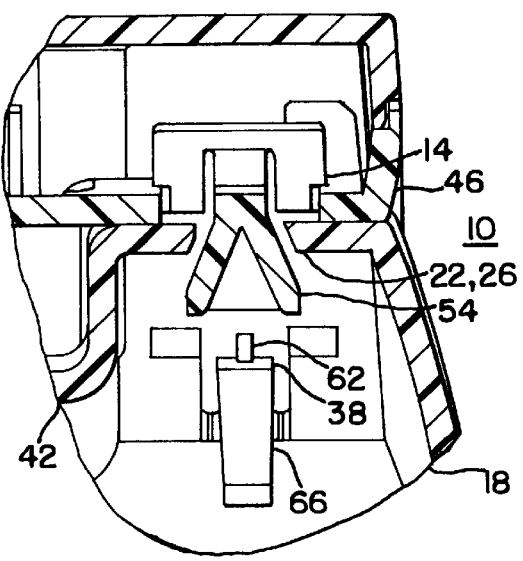

ADJUSTABLE STAND APPARATUS

FIELD OF THE INVENTION

The present invention relates to adjustable stand devices, and, in particular, adjustable devices capable of adjusting the viewing, or other, range of a videophone, or similar device, in a vertical motion.

BACKGROUND OF THE INVENTION

In today's increasingly electronic society, many advances have been made in the telecommunicative arts, and especially within the videoconferencing genre. Videoconferencing is made possible through the use of the videophone, which electronically reproduces the image of a first communicator on a video screen at the site of a second and any subsequent communicators, and vice versa. However, the effectiveness of the videophone is dependent upon an accurate electronic reproduction of the communicators. For example, the videophone must be adjusted to reproduce the desired image. The adjustment may possibly involve a vertical adjustment to focus on a particular image, taking into account the height of the image. Thus, there is a need for an apparatus that can be adjusted to focus on the communicator, or anyone or anything else necessary for the videoconference. This need is solved through the use of adjustable devices, similar to the present invention, which allow the videophones, or any like instrument, to adjust their viewing range in an up and down vertical motion.

Adjustable devices, or any like instruments, are presently known in the art. However, such devices are unable to be assembled in a simple manner, and the operation of these devices can be cumbersome. Additionally, these devices are unable to be readily disassembled by the user, if he or she so desires.

Thus, there exists the need for an adjustable device that can be assembled, disassembled and operated with relative ease.

Furthermore, there exists the need to provide an adjustable device that, once assembled, can be adjusted in a forward and aftward motion, and will prevent the unintentional disassembly of the adjustable device.

In addition, there exists the need to provide an adjustable device that will maintain its rigid nature so that the adjustable device will not move on its own without the assistance and direction of the user. That is, the videophone, or similar device, once adjusted, should remain in the same position until adjusted again.

Finally, there also exists the need for an adjustable device that will prevent the movement of the videophone, or similar device, in a lateral direction.

SUMMARY OF THE INVENTION

One aspect of the invention provides an adjustable stand apparatus that may be made of molded plastic. The apparatus includes a base member and a top member. The base member includes a left portion and a right portion. Both the left and the right portions include elongated openings. The elongated openings include retaining regions having a first width and first receiving regions having a second width, with the second width being greater than the first width. The elongated openings further include tab portions, which extend into the first receiving regions. The tab portions may include stop portions, which may preferably extend upward to prevent the disengagement of the top member from the base member. The stop portions may further include rib portions. The tab portions may further include lift portions, which preferably protrude downward to permit manual deflection of the tab portions. Preferably, the elongated openings may also include second receiving regions, which may be spaced apart from the first receiving regions. The left and right portions may also include channel regions. The top member also includes a left portion and a right portion. Both the left and the right portions of the top member include first guide portions, preferably of a dovetail shape, which extend from a bottom side of the top member. The first guide portions include an outer width, which is greater than the first width of the retaining regions of the elongated openings. The first guide portions are received in the first receiving regions, and are retained within the retaining regions. Preferably, the top member also includes second guide portions. The second guide portions may be of a dovetail shape, and may also include an outer width. The outer width may be greater than the first width of the retaining regions of the elongated openings. The second guide portions may also be received in the first receiving regions, and may also be retained within the retaining regions. The left and right portions may also include channel guide portions, also extending from the bottom side. The channel guide portions may fit within the channel regions, allowing forward-aftward movement, but preventing lateral movement.

A further aspect of the invention provides a method of assembling an adjustable stand apparatus. A base member and a top member are provided. The base member includes a left portion and a right portion. Both the left and the right portions include elongated openings. The elongated openings include retaining regions having a first width and receiving regions having a second width, with the second width being greater than the first width. The elongated openings further include tab portions, which extend into the receiving regions. The top member also includes a left portion and a right portion. Both the left and the right portions of the top member include guide portions, which extend from a bottom side of the top member. The guide portions include an outer width, which is greater than the first width of the retaining regions of the elongated openings. The guide portions are inserted into the receiving regions of the elongated openings. The tab portions are deflected in a downward direction. The guide portions are slid in a forward direction to allow the tab portions to retract into their original position. The guide portions are then retained within the elongated openings.

A further aspect of the invention provides a method of disassembling an adjustable stand apparatus. An adjustable stand apparatus is provided. The adjustable stand apparatus includes a base member and a top member. The base member includes a left portion and a right portion. Both the left and the right portions include elongated openings. The elongated openings include retaining regions having a first width and receiving regions having a second width, with the second width being greater than the first width. The elongated openings further include tab portions, which extend into the receiving regions. The top member also includes a left portion and a right portion. Both the left and the right portions of the top member include guide portions, which extend from a bottom side of the top member. The guide portions include an outer width, which is greater than the first width of the retaining regions of the elongated openings. The tab portions are manually deflected. The guide portions are slid in an aftward direction. The guide portions are then removed from the receiving regions of the elongated openings.

A further aspect of the invention provides a method of operating an adjustable stand apparatus. An adjustable stand apparatus is provided. The adjustable stand apparatus includes a base member and a top member. The base member includes a left portion and a right portion. Both the left and the right portions include elongated openings. The elongated openings include retaining regions having a first width and first receiving regions having a second width, with the second width being greater than the first width. The elongated openings further include tab portions, which extend into the first receiving regions. The left and right portions may also include channel regions. The top member also includes a left portion and a right portion. Both the left and the right portions of the top member include first guide portions, which extend from a bottom side of the top member. The first guide portions include an outer width, which is greater than the first width of the retaining regions of the elongated openings. Preferably, the top member also includes second guide portions. The second guide portions may be of a dovetail shape, and may also include an outer width. The outer width may be greater than the first width of the retaining regions of the elongated openings. The left and right portions may also include channel guide portions, also extending from the bottom side. The first guide portions are slid through the elongated openings in a first direction and a second direction, with the second direction being opposite the first direction. The first guide portions are then stopped in the first direction. The top member may be rotated along an arcuate path. Additionally, the first guide portions and the second guide portions may be stabilized in the elongated openings. Preferably, the second guide portions may also be slid through the elongated openings in the first direction and the second direction. Preferably, the channel guide portions may be slid through the channel regions in the first direction and the second direction, and may be stopped in the second direction.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and the equivalents thereof.

BRIEF DESCRIPTION OF THE DRAWINGS

FIG. 7 is a top view of a preferred embodiment, with an electronic device disposed thereon, of the adjustable stand apparatus;

FIG. 8 is a sectional view of FIG. 7, taken through line 8—8;

FIG. 9 is an enlarged view of the region within circle B of FIG. 8;

DETAILED DESCRIPTION OF THE PRESENTLY PREFERRED EMBODIMENTS

Figure 1:
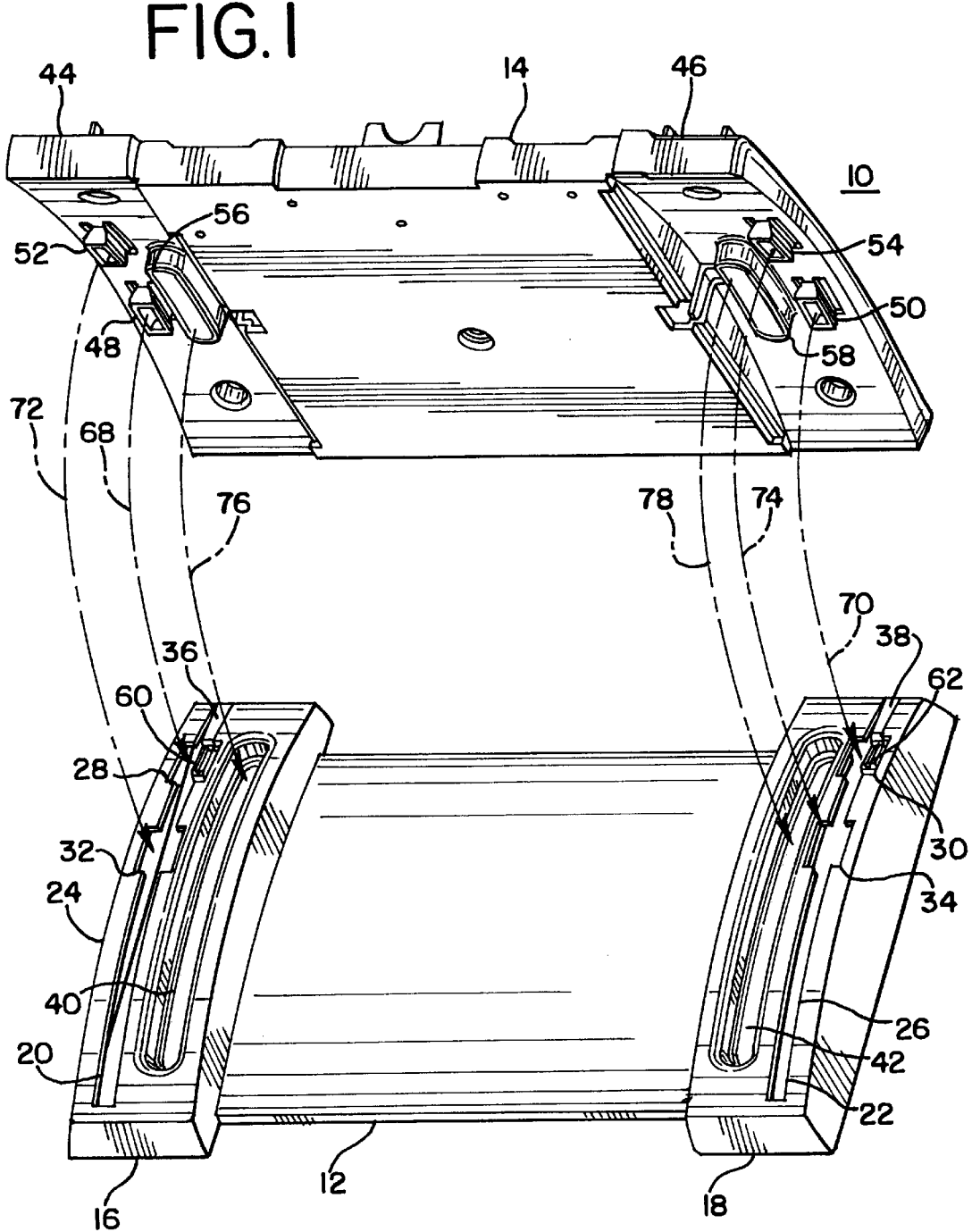
FIG. 1 is an exploded perspective view of a preferred embodiment of an adjustable stand apparatus made in accordance with the invention.

Referring to FIG. 1, reference numeral 10 represents a preferred embodiment of an adjustable stand apparatus. The adjustable stand apparatus 10 includes a base member 12 and a top member 14. Both the base member 12 and the top member 14 are preferably made of a rigid material, for example, standard molded polycarbonate or ABS plastic, but can also be made of any type of plastic, as well as any other similar material. The choice of standard molded polycarbonate or ABS plastic is to ensure both the rigidity and structure of the adjustable stand apparatus 10.

The base member 12 of the adjustable stand apparatus 10 includes a left portion 16 and a right portion 18. In the embodiment shown, within each of these portions 16, 18, there is included elongated openings 20, 22, which are shown as extending from the front to the rear of the base member 12. In the embodiment shown, the elongated openings 20, 22 include a retaining region 24, 26, a first receiving region 28, 30, and, preferably, a second receiving region 32, 34. The retaining regions 20, 22 are of a first width. Conversely, the four receiving regions 28, 30, 32, 34 are preferably of a second width. For reasons that will be discussed later, the second width is preferably greater than the first width. Also within the elongated openings 20, 22 are included tab portions 36, 38. The tab portions 36, 38 extend from a rear end of the elongated openings 20, 22 into the first receiving regions 28, 30. Also included in the left and right portions 16, 18 of the base member 12 are channel regions 40, 42.

The top member 14 of the adjustable stand apparatus 10 also includes a left portion 44 and a right portion 46. Within each of the left and right portions 44, 46, there is included first guide portions 48, 50 and, preferably, second guide portions 52, 54. Each of the four guide portions 48, 50, 52, 54 extend from the bottom side of the left and right portions 44, 46 of the top member 14. The four guide portions 48, 50, 52, 54 include an outer width which is greater than the width of the retaining regions 24, 26 of the base member 12. This outer width is slightly less than the width of the receiving regions 28, 30, 32, 34 of the base member 12. This design allows the four guide portions 48, 50, 52, 54 to be inserted into the receiving regions 28, 30, 32, 34. In the embodiment shown, also extending from the bottom side of the top member 14, are channel guide portions 56, 58. The channel guide portions 56, 58 are preferably of a width slightly smaller than the channel regions 40, 42 of the base member 12, so as to allow the channel guide portions 56, 58 entry into the channel regions 40, 42. Preferably, the channel regions 40, 42, in conjunction with the channel guide portions 56, 58, serve to allow movement of the top member 14 in both a forward and aftward direction, while preventing movement of the top member in a lateral direction.

With regards to the four guide portions 48, 50, 52, 54 and the four receiving regions 28, 30, 32, 34, it should be noted that the second guide portions 52, 54 and the second receiving regions 32, 34 are merely preferred embodiments of the invention, and are not requirements. The adjustable stand apparatus 10 can be designed with only first guide portions 48, 50, and only first receiving regions 32, 34. Conversely, the channel guide portions 56, 58 and the channel regions 40, 42 are also preferred embodiments of the invention, used in adding rigidity to the adjustable stand apparatus 10.

Finally, also shown in FIG. 1 on the base member 12, are the stop portions 60, 62 of the tab portions 36, 38. The stop portions 60, 62 serve to provide a forward mechanical stop during operation of the adjustable stand apparatus 10, as well as to prevent the unintentional disassembly of the adjustable stand apparatus 10. Preferably, the stop portions 60, 62 may include a rib portion, which may take the form of a rib-shaped protrusion integral with the tab portions 36, 38.

Figure 2:
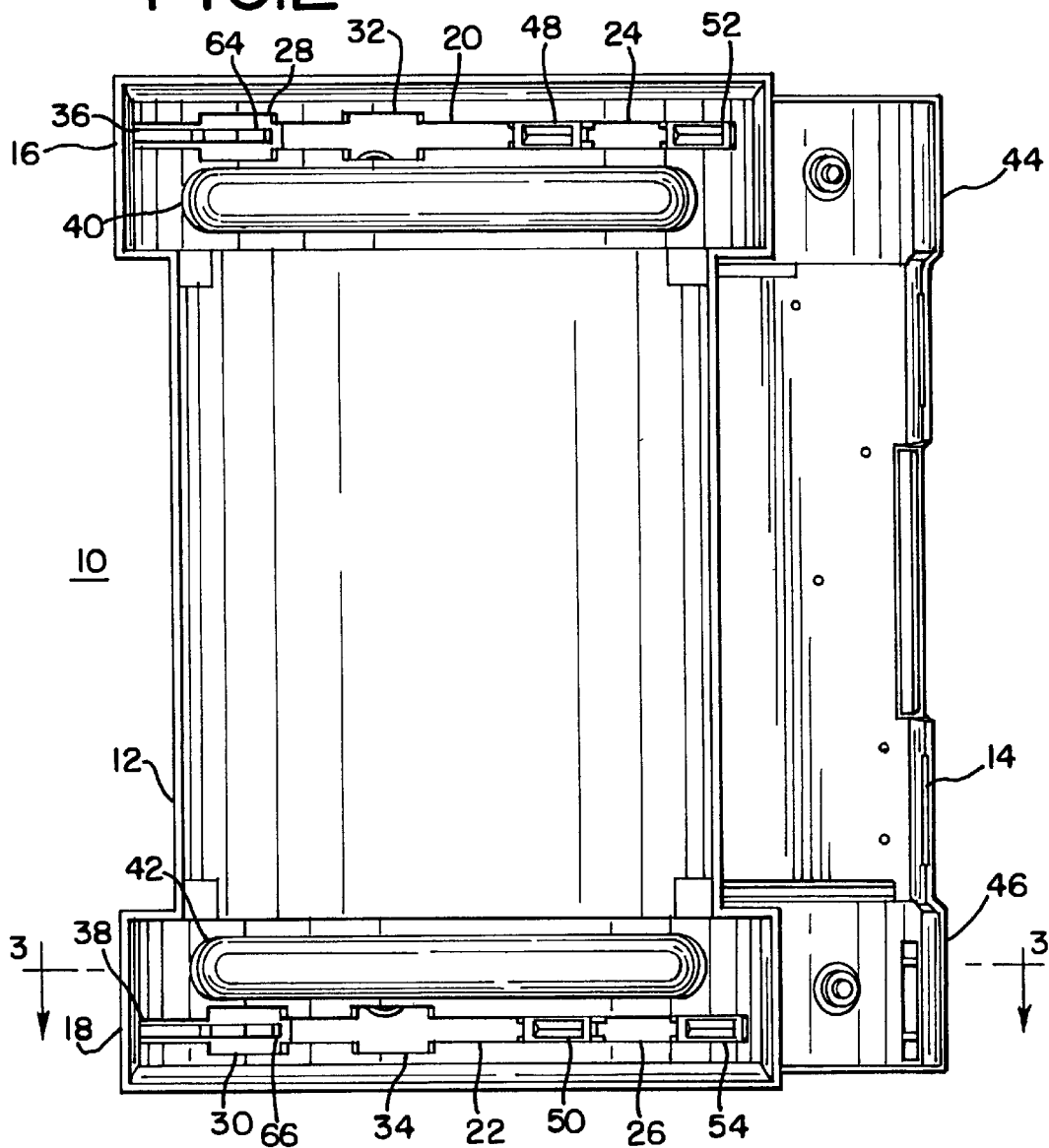
FIG. 2 is a bottom view of the embodiment of FIG. 1.
Figure 3:
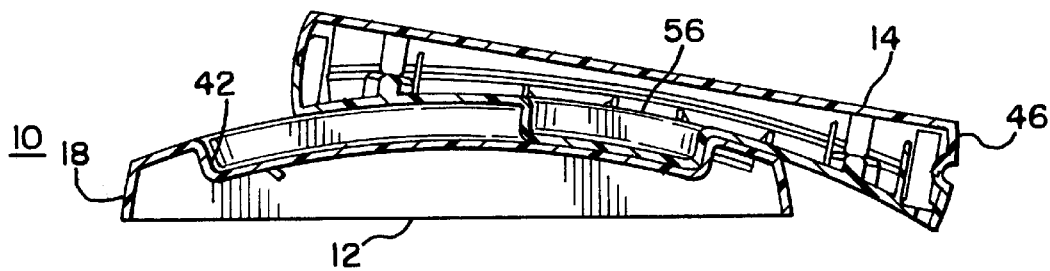
FIG. 3 is a sectional view of FIG. 2, taken through line 3—3.
Figure 11A:
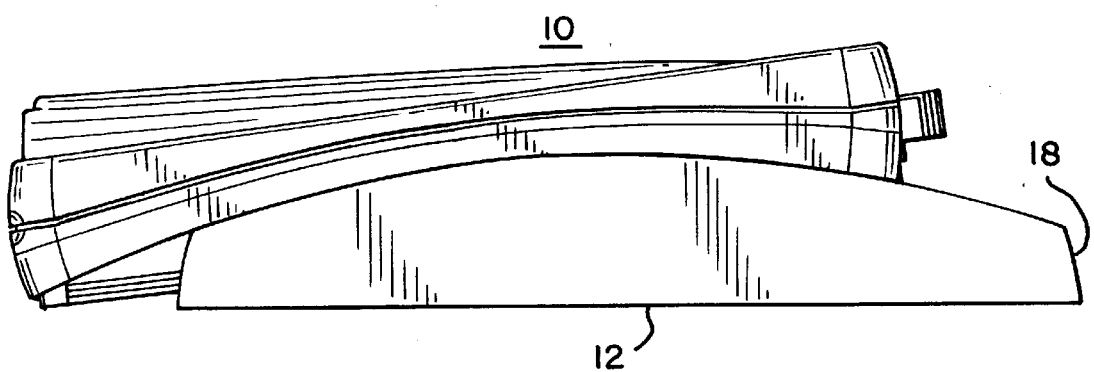
FIG. 11a is a side view of the embodiment of FIG. 7, shown with the top member rotated 7° forward.

Referring to FIGS. 2–3, the adjustable stand apparatus 10 is shown with the top member 14 rotated forward along an arcuate path. For reference, the view shown in FIGS. 2–3 is the bottom view of the adjustable stand apparatus 10 as shown in FIG. 11a. As shown in FIG. 2, the four guide portions 48, 50, 52, 54 are of a width larger than the retaining region 24, 26 of the elongated openings 20, 22 of the base member 12. When the top member 14 is engaged with the base member 12, the four guide portions 48, 50, 52, 54 pass through the corresponding four receiving regions 28, 30, 32, 34 of the base member 12. Furthermore, when the top member 14 slides in a forward direction, the four guide portions 48, 50, 52, 54 enter the retaining regions 24, 26 of the elongated openings 20, 22. This is the position shown in FIG. 2. Due to the fact that the width of the retaining regions 24, 26 is less than that of the four guide portions 48, 50, 52, 54, the retaining region 24, 26 prevents the four guide portions 48, 50, 52, 54 from separating from the base member 12. This difference in width also serves to stabilize the four guide portions 48, 50, 52, 54 within the elongated openings 20, 22.

As is shown in FIG. 3, the channel guide portions 56, 58 fit within the channel regions 40, 42, and rotate forward and aftward much in the same way as the four guide portions 48, 50, 52, 54 slide within the elongated openings 20, 22. Also depicted in FIG. 3 is the position in which the top member 14 is rotated forward to a point at which the contact of the channel guide portion 58 with the channel region 42 prevents any further forward motion of the top member 14.

Figure 4:
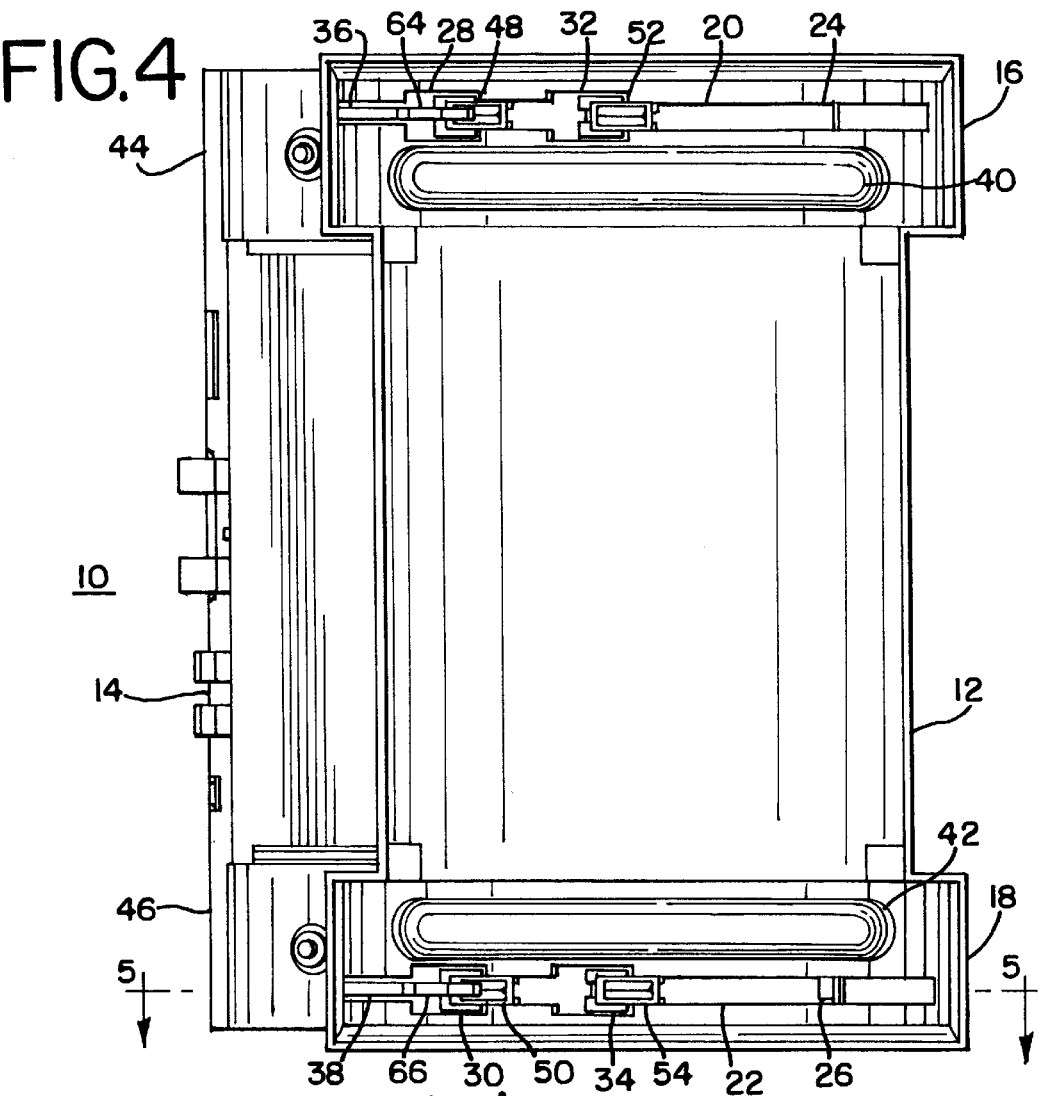
FIG. 4 is a bottom view of the embodiment of FIG. 1.
Figure 5:
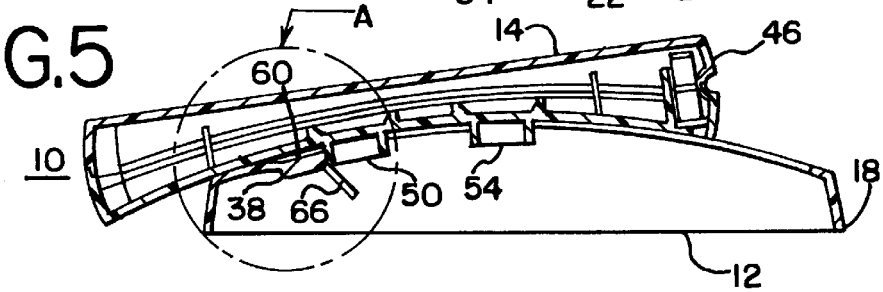
FIG. 5 is a sectional view of FIG. 4, taken through line 5—5.
Figure 6:
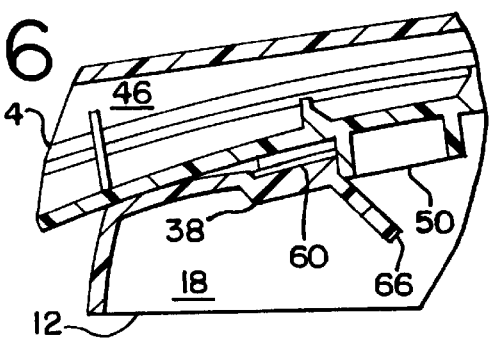
FIG. 6 is an enlarged view of the region within circle A of FIG. 5.
Figure 11B:
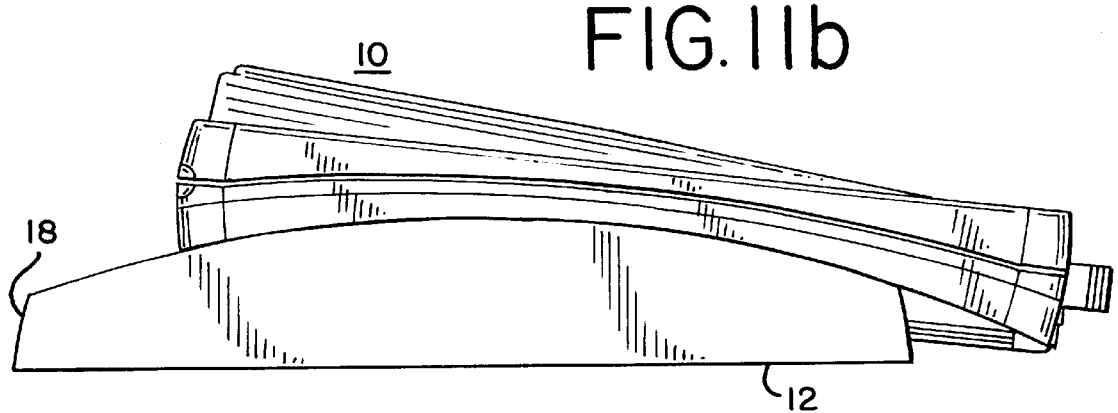
FIG. 11b is a side view of the embodiment of FIG. 7, shown with the top member rotated 7° aftward.

Referring to FIGS. 4–6, the adjustable stand apparatus 10 is shown with the top member 14 rotated aftward along an arcuate path. For reference, FIG. 4 is a bottom view of the adjustable stand apparatus 10 as depicted in FIG. 11b. As shown in FIG. 4, the first guide portions 48, 50 have entered the first receiving regions 28, 30, and the second guide portions 52, 54 have entered the second receiving regions 32, 34. In doing so, the first guide portions 48, 50 make contact with the stop portions 60, 62.

FIG. 5 shows the position in which the top member 14 is rotated aftward to a point at which the contact of the channel guide portion 58 with the channel region 42 prevents any further aftward motion. FIG. 6 shows the tab portion 38 as further including a stop portion 60 and a lift portion 66. Although not shown, the structure of the left tab portion 36 is the same as the right tab portion 38, with the stop portion referenced as numeral 62 (shown in FIG. 1), and the lift portion referenced as numeral 64 (shown in FIG. 4). By being in contact with the tab portions 36, 38, the first guide portions 48, 50 are prevented from being separated from the base member 12.

As mentioned above, the width of the retaining regions 24, 26 of the elongated openings 20, 22 of the base member 12 is less than the outer width of the four guide portions 48, 50, 52, 54 of the top member 14. FIGS. 7–9 show the interaction between the above features in more detail. With reference to FIG. 9, there is shown the interaction between the second guide portion 54 of the right portion 46 of the top member 14, with the elongated opening 22 of the right portion 18 of the base member 12. Each of the four guide portions 48, 50, 52, 54, preferably has a dovetail shape. This allows the guide portions to be inserted within the receiving regions of the elongated openings 20, 22 of the base member 12, and be retained within the base member 12, via the retaining regions 24, 26. This design allows the top member to slide forward and aftward within the elongated openings 20, 22, and be prevented from unintentional disengagement with the base member 12. FIG. 9 also shows, in more detail, the lift portion 66 of the tab portion 38, which is used by the user to manually deflect the tab portion 38 so as to disassemble the adjustable stand apparatus 10.

Figure 10:
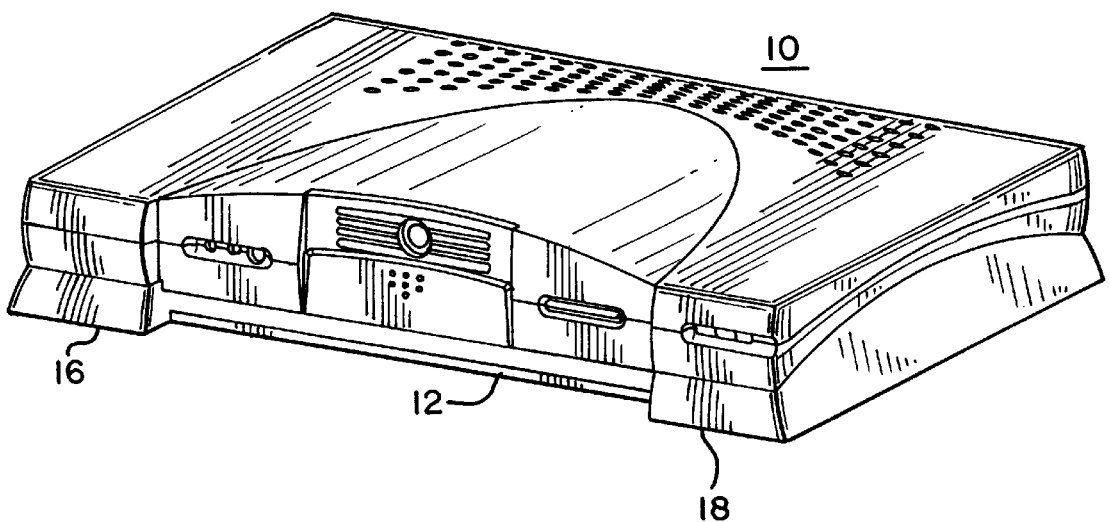
FIG. 10 is a perspective view of the embodiment of FIG. 7.

With regard to FIG. 10, the adjustable stand apparatus 10 is shown, with an electronic device disposed thereon, in a central position with respect to the base member 12 (i.e., neither rotated forward nor aftward). FIG. 11a shows the adjustable stand apparatus 10 rotated forward, along an arcuate path, with respect to the base member 12. FIG. 11b shows the adjustable stand apparatus 10 rotated aftward, along an arcuate path. As depicted in both FIGS. 11a and 11b, the preferable degree of arcuate rotation is 7° in both the forward and the aftward directions; however, the arcuate rotation of the top member 14 with respect to the base member may be greater or less.

The specifics of the structure of a preferred embodiment of the adjustable stand apparatus 10 having been disclosed, attention will now be directed to operation of the adjustable stand apparatus 10. With reference to FIG. 1, the apparatus may be assembled as follows: The first guide portions 48, 50 of the top member 14 are placed over the first receiving regions 28, 30 of the base member 12. This is shown via arrows 68, 70 in FIG. 1. In a similar manner, the second guide portions 52, 54 are placed over the second receiving regions 32, 34 (shown via arrows 72, 74), and the channel guide portions 56, 58 are placed over the channel regions 40, 42, as is shown via arrows 76, 78. At this point, the tab portions 36, 38 of the base member 12 are preventing entry of the first guide portions 48, 50 into the first receiving regions 28, 30. However, the tab portions 36, 38 may be deflected downward, by the application of a minor amount of force to the top member 14. At this point, the first guide portions 48, 50, the second guide portions 52, 54 and the channel guide portions 56, 58, will enter the first receiving regions 28, 30, the second receiving regions 32, 34 and the channel regions 40, 42, respectively. By rotating the top member 14 in a forward direction, the tab portions 36, 38 will "snap" back to their original positions, and the four guide portions 48, 50, 52, 54 will enter the retaining regions 24, 26 of the elongated openings 20, 22. Additionally, the channel guide portions 56, 58 will enter the channel regions 40, 42. At this point, the top member 14 is engaged with the base member 12, and assembly is complete. By returning to their original positions, and effectively standing in the way of the first guide portions 48, 50, the tab portions 36, 38, act to prevent the top member 14 from disengaging and separating from the base member 12.

Once the adjustable stand apparatus 10 has been assembled, in the manner described above, operation is just as simple. Owing to the fact that the top member 14 is slidably, as opposed to fixedly, attached to the base member 12, the top member 14 can be rotated both forward and aftward, depending upon the preferences of the user. The preferred arcuate rotations are shown in FIG. 11a, which shows a 7° forward rotation, and FIG. 11b, which shows a 7° aftward rotation, while the centered position is shown in FIG. 7. In the embodiment shown, the front edges of the elongated openings 20, 22 and the channel regions 40, 42 will serve to prevent the top member 14 from rotating, preferably, more than 7° in the forward direction with respect to the base member 12. Conversely, the back edges of the elongated openings 20, 22 and the channel regions 40, 42 will serve to prevent the top member 14 from rotating, preferably, more than 7° in the aftward direction with respect to the base member 12.

Disassembly of the adjustable stand apparatus 10 is as follows: First, the user manually deflects the lift portions 64, 66 of the tab portions 36, 38 of the base member 12 downward. Doing so will free the elongated openings 20, 22, allowing the first guide portions 48, 50 to enter the first receiving regions 28, 30. The user will then rotate the top member 14 aftward until the first guide portions 48, 50 have entered the first receiving regions 28, 30. At this time, the second guide portions 52, 54 will preferably have entered the second receiving regions 32, 34 of the elongated openings 20, 22. The top member 14 can then be lifted out of contact with the base member 12, completing the disassembly of the adjustable stand apparatus 10.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. An adjustable stand apparatus comprising:
    a base member, the base member including a left portion and a right portion, each of the left and right portions including an elongated opening, each of the elongated openings including a retaining region having a first width, and a first receiving region having a second width, the second width being greater than the first width, and a tab portion extending into the first receiving region;
    a top member, the top member including a left portion and a right portion, each of the left and right portions including a first guide portion, extending from a bottom side of the top member, the first guide portion including an outer width greater than the first width of the retaining region of the elongated opening of the base member; and
    wherein the first guide portion is received in the first receiving region of the elongated opening of the base member and is retained within the retaining region of the elongated opening.

2. The adjustable stand apparatus of claim 1, wherein each of the tab portions of the base member includes a stop portion, extending upward from the tab portion, to prevent disengagement of the first guide portion of the top member from the elongated opening of the base member.

3. The adjustable stand apparatus of claim 2, wherein each of the stop portions further includes a rib portion.

4. The adjustable stand apparatus of claim 3, wherein each of the tab portions of the base member further includes a lift portion.

5. The adjustable stand apparatus of claim 4, wherein each of the lift portions of the tab portions of the base member protrudes in a downward direction to permit manual deflection of the tab portion.

6. The adjustable stand apparatus of claim 5, wherein each of the left and right portions of the top member further includes a second guide portion, extending from the bottom side of the top member, the second guide portion including an outer width greater than the first width of the first receiving region of the elongated opening of the base member.

7. The adjustable stand apparatus of claim 6, wherein the each of the elongated openings of the base member further includes a second receiving region to receive the second guide portion.

8. The adjustable stand apparatus of claim 7, wherein the first guide portions and the second guide portions are of a dovetail shape.

9. The adjustable stand apparatus of claim 8, wherein each of the second receiving regions of the base member are spaced apart from the first receiving region.

10. The adjustable stand apparatus of claim 9, wherein each of the left and right portions of the base member further includes a channel region.

11. The adjustable stand apparatus of claim 10, wherein each of the left and right portions of the top member further comprises a channel guide portion, extending from the bottom side of the top member, the channel guide portion being adapted to fit within the channel region of the base member, to allow movement in a forward direction and an aftward direction, and to prevent movement in a lateral direction.

12. The adjustable stand apparatus of claim 10, wherein the top member and the bottom member are made of molded plastic.

13. A method of assembling an adjustable stand apparatus, comprising the steps of:
    providing a base member and a top member, the base member including a left portion and a right portion, each of the left and right portions including an elongated opening, each of the elongated openings including a retaining region having a first width, and a receiving region having a second width, the second width being greater than the first width, and a tab portion extending into the receiving region, the top member including a left portion and a right portion, each of the left and right portions including a guide portion, extending from a bottom side of the top member, the guide portion including an outer width greater than the first width of the retaining region of the elongated opening of the base member;
    inserting each of the guide portions of the top member into the receiving regions of the elongated openings of the base member;
    deflecting the tab portions of the base member in a downward direction;
    sliding the guide portions of the top member in a forward direction to allow the tab portions to retract into their original position; and
    retaining the guide portions of the top member within the elongated openings of the base member.

14. A method of disassembling an adjustable stand apparatus, comprising the steps of:
    providing an adjustable stand apparatus including a base member and a top member, the base member including a left portion and a right portion, each of the left and right portions including an elongated opening, each of the elongated openings including a retaining region having a first width, and a receiving region having a second width, the second width being greater than the first width, a tab portion extending into the receiving region, the top member including a left portion and a right portion, each of the left and right portions including a guide portion, extending from a bottom side of the top member, the guide portion including an outer width greater than the first width of the retaining region of the elongated opening of the base member;

manually deflecting the tab portions of the base member;

sliding the guide portions of the top member in a aftward direction; and removing the guide portions of the top member from the receiving regions of the elongated openings of the bottom member.

15. A method of operating an adjustable stand apparatus, comprising the steps of:

providing an adjustable stand apparatus including a base member and a top member, the base member including a left portion and a right portion, each of the left and right portions including an elongated opening, each of the elongated openings including a retaining region having a first width, and a first receiving region having a second width, the second width being greater than the first width, and a tab portion extending into the first receiving region, the top member including a left portion and a right portion, each of the left and right portions including a first guide portion, extending from a bottom side of the top member, the first guide portion including an outer width greater than the first width of the retaining region of the elongated opening of the base member;

sliding the first guide portions through the elongated openings in first direction and a second direction, the second direction being opposite of the first direction; and stopping the first guide portions in the first direction with the tab portions.

16. The method of claim 15, further providing a second guide portion extending from the bottom side of each of the left and right portions of the top member, each of the second guide portions having a width greater than the first width of the retaining region of the elongated openings of the base member; and sliding the second guide portions through the elongated openings in the first direction and the second direction.

17. The method of claim 16, further providing a channel region being disposed within each of the left and right portions of the base member, and a channel guide portion being disposed within each of the left and right portions of the top member and extending from the bottom side of the top member; and sliding the channel guide portions through the channel regions in the first direction and the second direction.

18. The method of claim 17, further including the step of stopping the channel guide portions in the second direction with the channel regions.

19. The method of claim 18, further including the step of rotating the top member along an arcuate path.

20. The method of claim 19, further including the step of stabilizing the guide portions within the elongated openings.

* * * * *